US010963354B2

(12) United States Patent
Ito

(10) Patent No.: US 10,963,354 B2
(45) Date of Patent: Mar. 30, 2021

(54) CONTROL APPARATUS AND RECOVERY PROCESSING METHOD FOR CONTROL APPARATUS

(71) Applicant: MITSUBISHI ELECTRIC CORPORATION, Chiyoda-ku (JP)

(72) Inventor: Masuo Ito, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 16/079,010

(22) PCT Filed: Apr. 1, 2016

(86) PCT No.: PCT/JP2016/060908
§ 371 (c)(1),
(2) Date: Aug. 22, 2018

(87) PCT Pub. No.: WO2017/168750
PCT Pub. Date: Oct. 5, 2017

(65) Prior Publication Data
US 2019/0057002 A1 Feb. 21, 2019

(51) Int. Cl.
*G06F 11/16* (2006.01)
*G06F 11/20* (2006.01)
(Continued)

(52) U.S. Cl.
CPC ...... *G06F 11/1658* (2013.01); *G06F 11/1438* (2013.01); *G06F 11/1675* (2013.01);
(Continued)

(58) Field of Classification Search
CPC .. G06F 11/1675; G06F 11/1438; G06F 11/20; G06F 11/2038; G06F 11/2097; G06F 11/1658; H04L 67/12
See application file for complete search history.

(56) References Cited

U.S. PATENT DOCUMENTS 7,739,403 B1 * 6/2010 Balakrishna ............ H04L 12/66
709/225
9,083,477 B2 * 7/2015 Matsui .................. H04J 3/0658
(Continued)

FOREIGN PATENT DOCUMENTS

DE 103 33 281 A1 2/2005
JP 1-134601 A 5/1989
(Continued)

OTHER PUBLICATIONS

International Search Report dated Jul. 5, 2016 in PCT/JP2016/060908 filed Apr. 1, 2016.
(Continued)

*Primary Examiner* — Kamini B Patel
(74) *Attorney, Agent, or Firm* — Xsensus LLP

(57) ABSTRACT

A control apparatus includes a synchronization state transmission/reception unit configured to transmit and receive a synchronization state to and from another control apparatus via a network, and a state data transmission/reception unit configured to transmit and receive state data to and from the another control apparatus via the network. Thus, the control apparatus can grasp the synchronization state of the another control apparatus. Further, even when the control apparatus is restarted due to a failure, the control apparatus receives state data from another control apparatus that has been synchronized with the control apparatus and is in operation so that the control apparatus can recover without stopping the entire system.

7 Claims, 10 Drawing Sheets

(51) Int. Cl.
*G06F 11/14* (2006.01)
*H04L 29/08* (2006.01)
(52) U.S. Cl.
CPC .......... *G06F 11/20* (2013.01); *G06F 11/2038* (2013.01); *G06F 11/2097* (2013.01); *H04L 67/12* (2013.01)

(56) References Cited

U.S. PATENT DOCUMENTS

| | | |
|---|---|---|
| 10,033,546 B2 * | 7/2018 | Lee ................ H04L 12/417 |
| 2008/0313426 A1 | 12/2008 | Terayama et al. |
| 2013/0139018 A1 * | 5/2013 | Takada ............. H04L 12/417 |
| | | 714/748 |
| 2019/0100237 A1 * | 4/2019 | Klesing ............ B62D 5/0484 |

FOREIGN PATENT DOCUMENTS

| | | |
|---|---|---|
| JP | 2002-244879 A | 8/2002 |
| JP | 2005-6376 A | 1/2005 |
| JP | 2006-209593 A | 8/2006 |
| JP | 2014-102681 A | 6/2014 |

OTHER PUBLICATIONS

German Office Action dated Dec. 17, 2020 in German Application No. 11 2016 006 679.1.

Chen, Xi: "Requirements and Concepts for Future Automotive Electronic Architectures from the View of Integrated Safety", Dissertation (Thesis) 2008.

* cited by examiner

CONTROL APPARATUS AND RECOVERY PROCESSING METHOD FOR CONTROL APPARATUS

TECHNICAL FIELD

The present invention relates to a control apparatus and a recovery method for the control apparatus, and more particularly, to a control apparatus used in a multiplex system and a recovery processing method for the control apparatus.

BACKGROUND ART

Hitherto, in control apparatus to be used in a vehicle, two control apparatus are provided as a dual system in preparation for occurrence of a failure in one of the control apparatus. There has also been proposed a system in which calculation results obtained by the two control apparatus included in the dual system are compared with each other, and when the calculation results differ from each other, fail-safe processing is performed so that output is performed safely.

For example, in Patent Literature 1, there is described an information processing apparatus configured to cause two processors to operate in synchronization with each other. In Patent Literature 1, when an internal failure occurs in any one of the two processors and consequently outputs from the two processors do not match, one of the processors in which the failure has occurred is identified. Then, through use of internal information on the processor in which no failure occurs and with a dual configuration, processing that has been performed at the time of occurrence of the failure is continued. This operation is implemented by the following configuration. First, in addition to the two processors, a main storage and a dual-system control circuit are provided. Further, the dual-system control circuit and the two processors are connected to each other by dedicated signal lines, and the two processors are reset in synchronization with each other. Then, information on a state before the occurrence of the failure is obtained from the main storage.

CITATION LIST

Patent Literature

[PTL 1] JP 2002-244879 A

SUMMARY OF INVENTION

Technical Problem

The following case is considered: in a multiplex system in which a plurality of control apparatus are connected to one another via a network, a failure that can be recovered by restart occurs in one of the control apparatus. The failure that can be recovered by restart refers to, for example, a software error that occurs due to static electricity or background radiation, and is a failure in which the apparatus enters an operable state again by being reset by a watchdog timer. In a case where such a failure that can be recovered by restart has occurred, even when the other control apparatus in which no failure occurs continue a fail operation, it is desired that the control apparatus in which no failure occurs and the control apparatus in which the failure has occurred be consequently synchronized with one another for recovery. In this case, all the control apparatus can return to the normal operation while the entire system does not stop the operation.

However, with Patent Literature 1, the operation can be resumed continuously from the state before the occurrence of the failure, but there is a problem in increased cost because hardware components other than the processors, such as the main storage and the dual-system control circuit, are required. Further, there is another problem in that, when a failure has occurred in one of the processors, the operation of the entire system is required to be temporarily stopped because all the processors are required to be reset.

The present invention has been made in order to solve the above-mentioned problems, and it is an object of the present invention to provide a control apparatus and a recovery processing method for the control apparatus, for implementing a control system including a plurality of control apparatus and being capable of allowing, when a failure has occurred in one of the control apparatus in the control system, the control apparatus in which the failure has occurred to recover without temporarily stopping the entire system and without requiring an additional hardware component.

Solution to Problem

According to one embodiment of the present invention, there is provided a control apparatus used in a multiplex system, the control apparatus being configured to operate in synchronization with another control apparatus via a network, the control apparatus including: a state data storage unit configured to store state data indicating a control state of the control apparatus; a state data transmission/reception unit configured to transmit the state data stored in the state data storage unit to the another control apparatus via the network, and to receive state data on the another control apparatus from the another control apparatus via the network; a synchronization state transmission/reception unit configured to transmit information on a synchronization state, which indicates whether a state of synchronization of the control apparatus with the another control apparatus is a synchronization preparation state or a synchronization completion state, to the another control apparatus via the network, and to receive information on a synchronization state of the another control apparatus from the another control apparatus via the network; and a state synchronization management unit configured to, when the control apparatus is to be started or restarted: temporarily set the information on the synchronization state of the control apparatus to the synchronization preparation state; determine whether the information on the synchronization state of the another control apparatus, which has been received by the synchronization state transmission/reception unit, is set to the synchronization completion state; overwrite, when it is determined that the information is set to the synchronization completion state, the state data on the another control apparatus, which has been received by the state data transmission/reception unit, into the state data storage unit as the state data on the control apparatus; and update the information on the synchronization state of the control apparatus from the synchronization preparation state to the synchronization completion state.

Advantageous Effects of Invention

According to the control apparatus of one embodiment of the present invention, the synchronization state of another control apparatus can be grasped, and further, even when restart occurs due to a failure in the control apparatus, the state data can be received from another control apparatus that has been synchronized with the control apparatus and is in operation. As a result, it is possible to implement the control system capable of allowing the control apparatus in which the failure has occurred to recover without temporarily stopping the entire system and without requiring an additional hardware component.

DESCRIPTION OF EMBODIMENTS

First Embodiment

Figure 1:
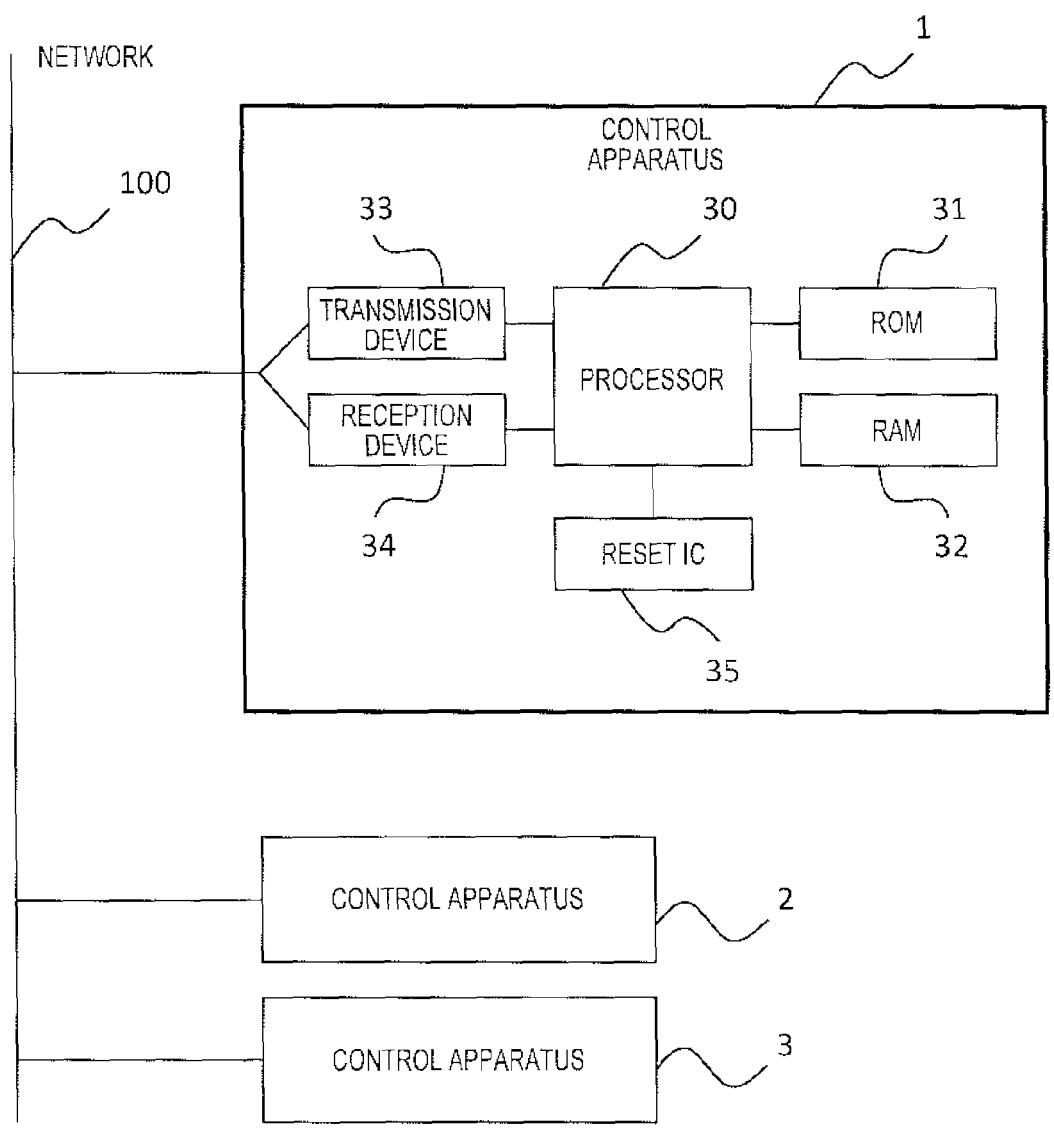
FIG. 1 is a configuration diagram for illustrating a configuration of an entire control system and a hardware configuration of each control apparatus in a first embodiment of the present invention.

FIG. 1 is a diagram for illustrating a configuration of an entire control system in a first embodiment of the present invention. As illustrated in FIG. 1, in the control system in the first embodiment, a plurality of control apparatus 1 to 3 are connected to one another via a network 100. The control apparatus 1 to 3 operate under a state of being synchronized with one another. The network 100 is, for example, Ethernet (JP registered trademark), FlexRay (JP registered trademark), or Time-Triggered CAN (TTCAN). Although three control apparatus are illustrated in FIG. 1, any control system can be employed as long as the entire control system is a multiplex system, and hence the number of control apparatus is not particularly limited as long as the number is two or more.

The control apparatus 1, the control apparatus 2, and the control apparatus 3 have the same configuration, and hence a hardware configuration of each control apparatus is described through use of the control apparatus 1. As illustrated in FIG. 1, the control apparatus 1 includes a processor 30, a ROM 31, a RAM 32, a transmission device 33, a reception device 34, and a reset IC 35.

The ROM 31 is a memory configured to store a program of the control apparatus 1.

The processor 30 is a device configured to sequentially read out a program from the ROM 31 to execute processing in accordance with the read program.

The RAM 32 is a memory configured to hold data during the execution of a program being processed by the processor 30.

The transmission device 33 is a device configured to convert data processed by the processor 30 into a physical signal conforming to a network protocol and transmit the data onto the network 100.

The reception device 34 is a device configured to receive a physical signal flowing on the network 100, convert the signal into data that can be interpreted by the processor 30, and passes the resultant data to the processor 30.

The reset IC 35 is a device configured to monitor whether or not a program operating on the processor 30 is operating normally and reset the processor 30 when an abnormality occurs.

Figure 2:
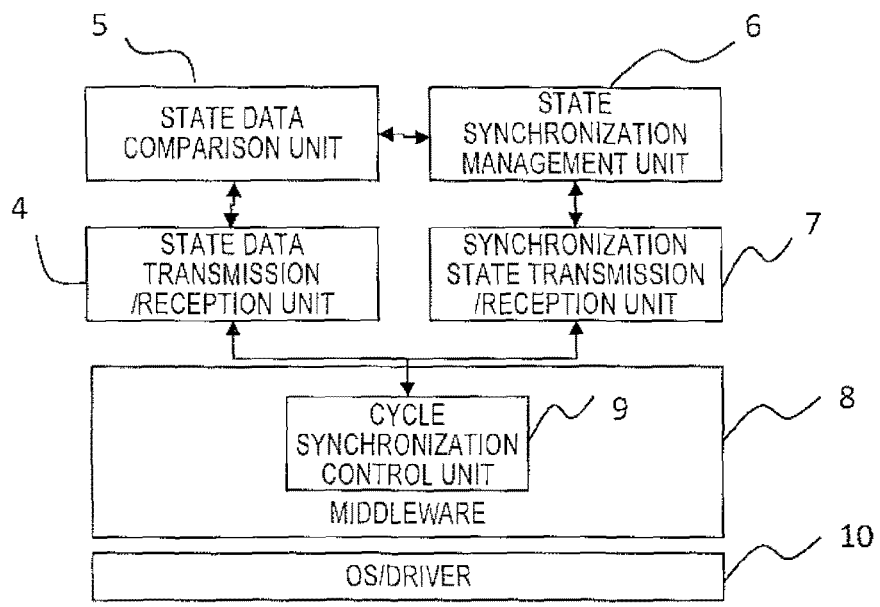
FIG. 2 is a block configuration diagram for illustrating an internal configuration of each control apparatus according to the first embodiment of the present invention.

FIG. 2 is a functional block diagram of the control apparatus 1 according to the first embodiment. As described above, the control apparatus 1, the control apparatus 2, and the control apparatus 3 have the same configuration, and hence an internal functional configuration of each control apparatus is described through use of the control apparatus 1 in this case as well. As illustrated in FIG. 2, the control apparatus 1 includes a state data transmission/reception unit 4, a state data comparison unit 5, a state synchronization management unit 6, a synchronization state transmission/reception unit 7, middleware 8, and an OS and driver 10. Further, a cycle synchronization control unit 9 is provided in the middleware 8. In FIG. 2, the state data transmission/reception unit 4, the state data comparison unit 5, the state synchronization management unit 6, the synchronization state transmission/reception unit 7, the middleware 8, the cycle synchronization control unit 9, and the OS and driver 10 are each implemented by the CPU 30 executing a program stored in the ROM 31 of FIG. 1.

As the OS and driver 10 and the middleware 8, for example, AUTOSAR (JP registered trademark), which is a standard software platform in the field of automobiles, is used.

The cycle synchronization control unit 9 provided in the middleware 8 corresponds to a synchronized time-base manager (StbM) when the middleware 8 is AUTOSAR (JP registered trademark). The cycle synchronization control unit 9 is configured to achieve synchronization among the control apparatus 1 to 3 with a trigger based on a global timer on the network 100. The cycle synchronization control unit 9 outputs cycle synchronization 25 (see FIG. 3) for each main cycle 20 (see FIG. 3), which is set in advance.

The state data transmission/reception unit 4 transmits and receives, as a behavior of the control apparatus 1, state data indicating a control state of a vehicle that is managed within the control apparatus 1, to and from the other control apparatus 2 and 3 via the transmission device 33 and the reception device 34 of FIG. 1. As used herein, the state data indicating the control state refers to, for example, in a vehicle in which an automatic driving system is installed, data indicating whether the vehicle is in an automatic driving mode or a manual driving mode, or data indicating a status of each of functions, such as functions of causing the vehicle to turn left and right during travel and causing the vehicle to merge with another lane during travel, or a function of parking the vehicle when the vehicle is to be stopped. Each of the control apparatus 1 to 3 stores its own state data in the RAM 32.

The state data comparison unit 5 compares the state data on the control apparatus 2 and 3, which has been acquired by the state data transmission/reception unit 4, with the state data stored in the RAM 32, which is managed within the control apparatus 1.

When the control apparatus 1 is restarted under a state in which the control apparatus 1 to 3 are synchronized with one another, the state synchronization management unit 6 overwrites the state data acquired from the other control apparatus 2 and 3 into the RAM 32 of the control apparatus 1 as the state data on the control apparatus 1, to thereby match the state data on the control apparatus 1 with the state data on the control apparatus 2 and the control apparatus 3. Further, the state synchronization management unit 6 manages a synchronization state of the control apparatus 1. The synchronization state refers to information indicating whether a state of synchronization of the control apparatus 1 with the control apparatus 2 and 3 is "preparing for synchronization" (synchronization preparation state) or "synchronization completed" (synchronization completion state). The state "preparing for synchronization" (synchronization preparation state) is a state in which the control apparatus 1 is not synchronized with the control apparatus 2 and 3. Meanwhile, the state "synchronization completed" (synchronization completion state) is a state in which the control apparatus 1 is synchronized with the control apparatus 2 and 3. The synchronization state is managed by the state synchronization management unit 6, but may be stored in the RAM 32.

The synchronization state transmission/reception unit 7 notifies the other control apparatus 2 and 3 of the fact that the synchronization of the state has been completed, or has not been completed, by the state synchronization management unit 6. Specifically, the synchronization state transmission/reception unit 7 transmits and receives information on the synchronization state managed by the state synchronization management unit 6 to and from the other control apparatus 2 and 3 via the transmission device 33 and the reception device 34 of FIG. 1.

Next, a description is given of a processing procedure of the control apparatus according to the first embodiment. As described above, the control apparatus 1, the control apparatus 2, and the control apparatus 3 have the same configuration and perform the same operation, and hence the processing procedure of each control apparatus is described through use of the control apparatus 1. The processing procedure is summarized as follows: after being started or restarted, the control apparatus 1 transmits and receives information on the synchronization state and the state data to and from the other control apparatus 2 and 3, and executes normal processing when the synchronization state is reached among the control apparatus 1 to 3.

Figure 4:
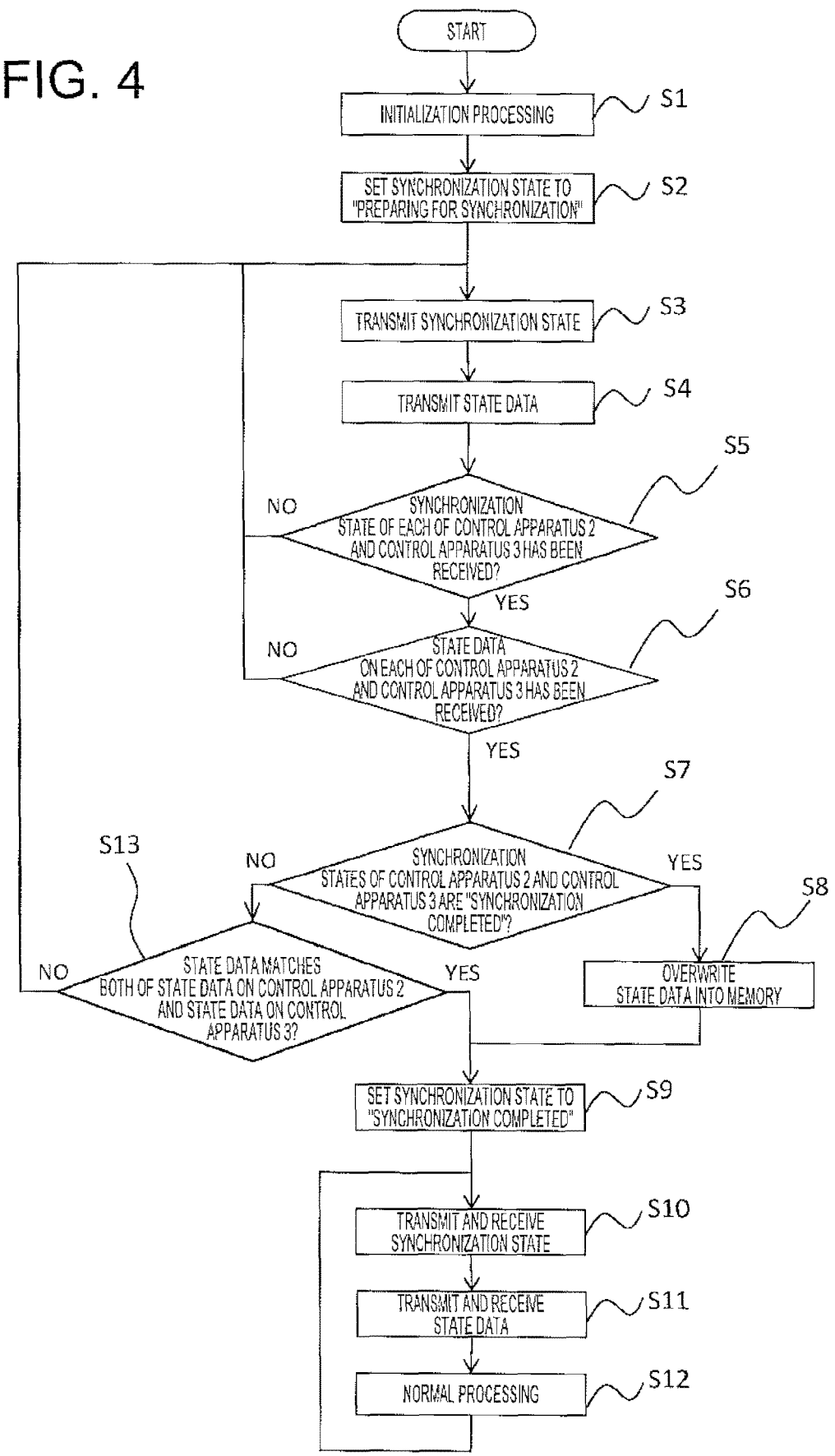
FIG. 4 is a flowchart for illustrating a flow of processing in the first embodiment of the present invention.

Details of the processing procedure are described with reference to a processing flow illustrated in FIG. 4. FIG. 4 is an illustration of the processing flow of the control apparatus 1. "Start" at the head of the flow of FIG. 4 represents starting of the control apparatus 1 by turning on the power of the control apparatus 1, or restarting of the control apparatus 1 through resetting processing by a watchdog timer or the like after a failure occurred in the control apparatus 1. That is, when the power of the control apparatus 1 has been turned on, or when the control apparatus 1 has been restarted after the failure occurred in the control apparatus 1, the processing of the flow of FIG. 4 is performed.

After the start, the control apparatus 1 executes initialization processing (Step S1). This initialization processing is the same as initialization processing to be executed in a general control apparatus.

Next, the state synchronization management unit 6 sets the synchronization state of the control apparatus 1 to "preparing for synchronization" (Step S2).

Next, the synchronization state transmission/reception unit 7 transmits the synchronization state of the control apparatus 1 to the other control apparatus 2 and 3 (Step S3).

Further, the state data transmission/reception unit 4 transmits the state data on the control apparatus 1 to the other control apparatus 2 and 3 (Step S4).

At the same time, the synchronization state transmission/reception unit 7 receives the synchronization state of each of the control apparatus 2 and the control apparatus 3 (Step S5), and the state data transmission/reception unit 4 receives the state data on each of the control apparatus 2 and the control apparatus 3 (Step S6). When the synchronization state and the state data have been received, the processing proceeds to Step S7. Meanwhile, when the synchronization state and the state data have failed to be received, the processing returns to Step S3.

In Step S7, the state synchronization management unit 6 determines whether the synchronization state of each of the control apparatus 2 and the control apparatus 3 is "preparing for synchronization" or "synchronization completed" (Step S7). When both of the synchronization states of the control apparatus 2 and the control apparatus 3 are "synchronization completed", the processing proceeds to Step S8. Otherwise, the processing proceeds to Step S13.

In Step S13, the state data comparison unit 5 compares the state data received from each of the control apparatus 2 and the control apparatus 3 with the state data stored in the RAM 32 of the control apparatus 1 (Step S13).

As a result of the comparison performed in Step 13, when both of the state data on the control apparatus 2 and the state data on the control apparatus 3 match the state data on the control apparatus 1, the state synchronization management unit 6 sets the synchronization state of the control apparatus 1 to "synchronization completed" (Step S9). Otherwise, the processing returns to Step S3.

After the synchronization state is set to "synchronization completed" in Step S9, the processing steps of Step S10 to Step S12 are repeated at the main cycle 20 (see FIG. 3) set in advance. The processing steps of Step S10 to Step S12 are a normal operation of the control apparatus 1. The normal operation to be performed in Step S10 to Step S12 is specifically described. First, the synchronization state transmission/reception unit 7 transmits and receives the synchronization state to and from the control apparatus 2 and 3 (Step S10), the state data transmission/reception unit 4 transmits and receives the state data to and from the control apparatus 2 and 3 (Step S11), and the processor 30 executes normal processing (Step S12). In this manner, the processing steps of Step S10 to Step S12 are repeatedly executed at the main cycle 20 (see FIG. 3).

Meanwhile, in Step S8, the state synchronization management unit 6 overwrites the state data received from the control apparatus 2 or the control apparatus 3 into the RAM 32 of the control apparatus 1 (Step S8), and sets the synchronization state of the control apparatus 1 to "synchronization completed" (Step S9).

After Step S9, at the main cycle 20 (see FIG. 3) set in advance, the synchronization state transmission/reception unit 7 transmits and receives the synchronization state (Step S10), the state data transmission/reception unit 4 transmits and receives the state data (Step S11), and the processor 30 repeats the normal processing (S12).

The case in which it is determined in Step S7 described above that at least one of the synchronization states of the control apparatus 2 and the control apparatus 3 is not "synchronization completed" corresponds to a case in which the synchronization state has never been "synchronization completed" until now in at least one of the control apparatus 2 and the control apparatus 3. That is, this case corresponds to a case in which the entire system including the control apparatus 1, the control apparatus 2, and the control apparatus 3 is started.

Meanwhile, the case in which it is determined in Step S7 described above that both of the synchronization states of the control apparatus 2 and the control apparatus 3 are "synchronization completed" indicates the result of the case in which all the control apparatus 1, the control apparatus 2, and the control apparatus 3 have been "synchronization completed" once. Thus, this case corresponds to a case in which the control apparatus 2 and the control apparatus 3 are operating normally and only the control apparatus 1 has been restarted.

Therefore, the flow of FIG. 4 supports, when an automatic driving system for a vehicle is taken as an example, both of a case in which the entire control system including the control apparatus 1, the control apparatus 2, and the control apparatus 3 is started by, for example, turning on an ignition switch of the vehicle (hereinafter referred to as "IG ON"), and a case in which during the operation of the control system after "IG ON", while the control apparatus 2 and the control apparatus 3 are operating normally, only the control apparatus 1 has been restarted through resetting processing caused by occurrence of a failure.

Figure 7:
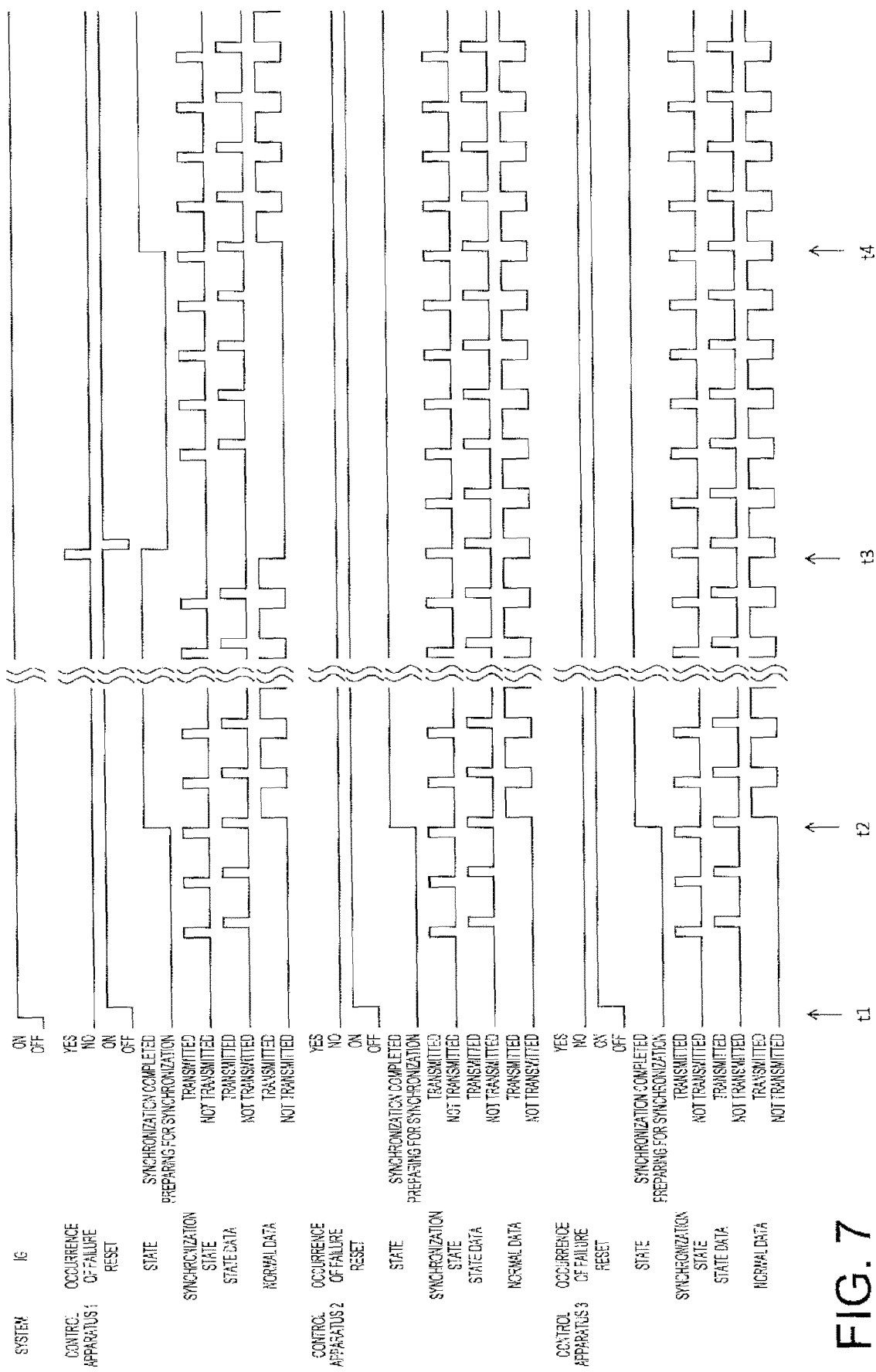
FIG. 7 is a timing chart for illustrating an operation in the first embodiment of the present invention.

A description of the operation of the flow of FIG. 4 is supplemented with reference to a timing chart of FIG. 7. In FIG. 7, the respective vertical axes represent the following states from the top:

whether the control system is ON or OFF;

whether or not a failure has occurred in the control apparatus 1, whether resetting of the control apparatus 1 is ON or OFF, whether the synchronization state is "synchronization completed" or "preparing for synchronization", whether or not the synchronization state has been transmitted, whether or not the state data has been transmitted, and whether or not normal data has been transmitted;

whether or not a failure has occurred in the control apparatus 2, whether resetting of the control apparatus 2 is ON or OFF, whether the synchronization state is "synchronization completed" or "preparing for synchronization", whether or not the synchronization state has been transmitted, whether or not the state data has been transmitted, and whether or not normal data has been transmitted; and whether or not a failure has occurred in the control apparatus 3, whether resetting of the control apparatus 3 is ON or OFF, whether the synchronization state is "synchronization completed" or "preparing for synchronization", whether or not the synchronization state has been transmitted, whether or not the state data has been transmitted, and whether or not normal data has been transmitted.

Further, in FIG. 7, the horizontal axis represents time.

As illustrated in FIG. 7, first, at a time t1, when "IG ON" is performed in the control system, the control apparatus 1 to 3 are started with the synchronization state being set to "preparing for synchronization", and transmit and receive the synchronization state and the state data to and from one another. Then, at a time t2, the state data match, and the control apparatus 1 to 3 set the synchronization states to "synchronization completed" to start the normal operation.

Further, as illustrated in FIG. 7, for example, it is assumed that a failure has occurred in the control apparatus 1 at a time t3. In this case, the control apparatus 1 is reset. Simultaneously with the reset, the control apparatus 1 sets the synchronization state to "preparing for synchronization", and is then started. Then, the control apparatus 1 transmits and receives the synchronization state and the state data to and from the control apparatus 2 and the control apparatus 3, and overwrites the state data received from the control apparatus 2 or the control apparatus 3 into the RAM 32 of the control apparatus 1. At a time t4, the overwriting is completed, and the control apparatus 1 sets the synchronization state to "synchronization completed" to start the normal operation.

As described above, in the first embodiment, when a failure occurs in one control apparatus, while other control apparatus in which no failure occurs continue the operation, the state of the control apparatus in which the failure occurred is caused to recover to a state of being synchronized with the other control apparatus. Thus, it is possible to return the operation of all the control apparatus to a normal operation without providing a dedicated hardware component and without stopping the entire system.

As described above, the control apparatus 1 according to the first embodiment is a control apparatus used in a multiplex system, the control apparatus being configured to operate in synchronization with the other control apparatus 2 and 3 via the network 100. The control apparatus 1 includes: the RAM 32 (state data storage unit) configured to store the state data indicating the control state of the control apparatus 1; the state data transmission/reception unit 4 configured to transmit the state data stored in the RAM 32 to the other control apparatus 2 and 3 via the network 100, and to receive the state data on the other control apparatus 2 and 3 from the control apparatus 2 and 3 via the network 100; the synchronization state transmission/reception unit 7 configured to transmit the information on the synchronization state, which indicates whether the state of synchronization of the control apparatus 1 with the other control apparatus 2 and 3 is a synchronization preparation state or a synchronization completion state, to the other control apparatus 2 and 3 via the network 100, and to receive the information on the synchronization states of the other control apparatus 2 and 3 from the other control apparatus 2 and 3 via the network 100; and the state synchronization management unit 6 configured to, when the control apparatus 1 is to be started or restarted, temporarily set the information on the synchronization state of the control apparatus 1 to the synchronization preparation state, determine whether the information on the synchronization states of the other control apparatus 2 and 3, which has been received by the synchronization state transmission/reception unit 7, is set to the synchronization completion state, overwrite, when it is determined that the information is set to the synchronization completion state, the state data on the other control apparatus 2 and 3, which has been received by the state data transmission/reception unit 4, into the RAM 32 as the state data on the control apparatus 1, and update the information on the synchronization state of the control apparatus 1 from the synchronization preparation state to the synchronization completion state. With this configuration, even when a failure occurs in the control apparatus 1, the control apparatus 1 can return to a normal operation under a state of being synchronized with the other control apparatus 2 and 3 without stopping the operation of the entire control system and without requiring an additional hardware component.

The control apparatus 1 according to the first embodiment further includes the state data comparison unit 5 configured to, when the control apparatus 1 is to be started or restarted, in a case where the state synchronization management unit 6 determines that the information on the synchronization states of the other control apparatus 2 and 3 is set to the synchronization preparation state, compare the state data on the other control apparatus 2 and 3, which has been received by the state data transmission/reception unit 4, with the state data on the control apparatus 1 stored in the RAM 32. Then, as a result of the comparison performed by the state data comparison unit 5, when the state data on the other control apparatus 2 and 3, which has been received by the state data transmission/reception unit 4, matches the state data stored in the RAM 32, the state synchronization management unit 6 updates the information on the synchronization state of the control apparatus 1 from the synchronization preparation state to the synchronization completion state without overwriting the state data into the RAM 32. With this configuration, because the case in which the synchronization states of the control apparatus 2 to 3 are the synchronization preparation state corresponds to a case in which the control system is to be started, the control apparatus 1 to 3 are started with the synchronization state being set to the synchronization preparation state, and start a normal operation when it has been confirmed that the state data match. Thus, it is possible to implement a quicker starting operation.

Second Embodiment

Figure 3:
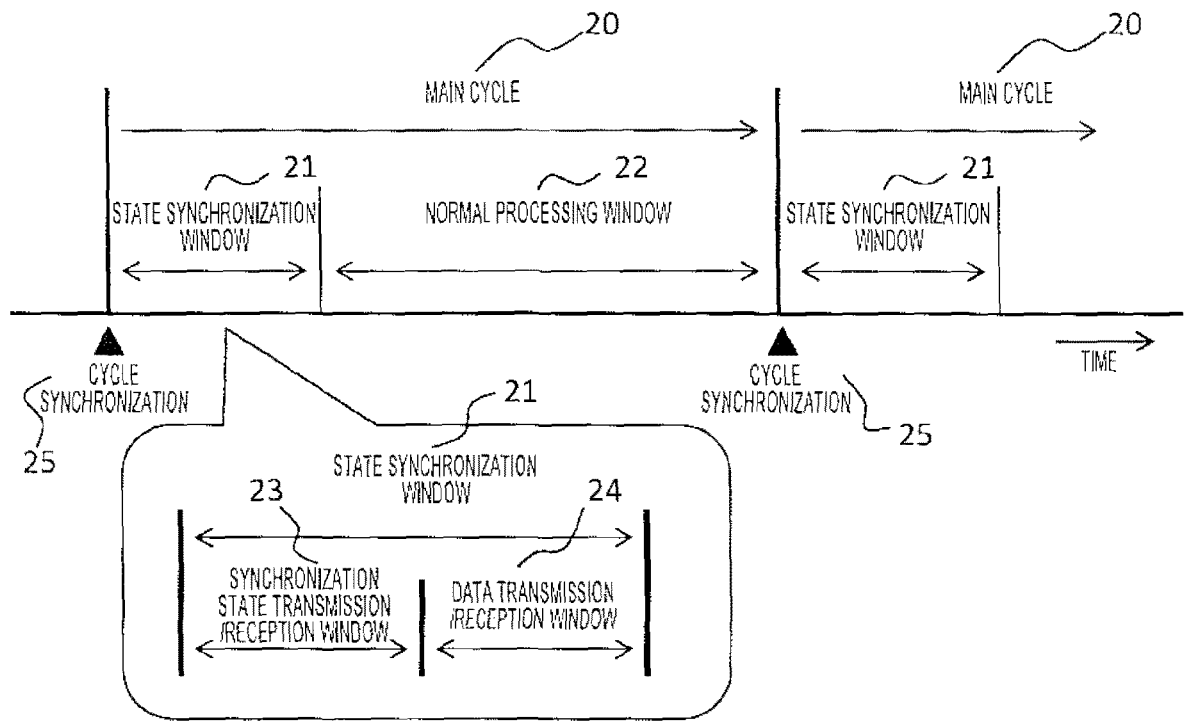
FIG. 3 is a diagram for illustrating windows of each operation cycle in the second embodiment of the present invention.

FIG. 3 is a diagram for illustrating windows of each operation cycle in a second embodiment of the present invention. In FIG. 3, the operation cycle of each of the control apparatus 1, the control apparatus 2, and the control apparatus 3 is illustrated. In each of the control apparatus 1 to 3, the main cycle 20 is started at the cycle synchronization 25 obtained from the cycle synchronization control unit 9. As described above, the cycle synchronization control unit 9 generates the cycle synchronization 25 with a trigger based on a global timer on the network 100. The control apparatus 1 to 3 are subject to synchronization control by the cycle synchronization control unit 9 in such a manner, and hence the main cycles 20 of the respective control apparatus 1 to 3 are consequently synchronized with one another.

Further, as illustrated in FIG. 3, the main cycle 20 includes a state synchronization window 21 and a normal processing window 22. The normal processing window 22 is a window of a time slot in which normal processing, for example, a general application program, is to be executed. Further, the state synchronization window 21 is divided into a data transmission/reception window 24 and a synchronization state transmission/reception window 23. The data transmission/reception window 24 is a window for the state data transmission/reception unit 4 to transmit and receive the state data. The synchronization state transmission/reception window 23 is a window for the synchronization state transmission/reception unit 7 to transmit and receive the synchronization state. As a method of transmitting and receiving the state data and the synchronization state by the control apparatus 1 to 3 in the data transmission/reception window 24 and the synchronization state transmission/reception window 23, each window may be further divided temporally to allocate a time slot to each of the control apparatus for use, or each of the control apparatus may transmit data at the timing of the head of the window and the data may be processed on the basis of priorities.

As described above, in the second embodiment, an operation for synchronization is separated from a normal operation to prevent the operation for synchronization from affecting the normal processing of the control apparatus that is operating normally. It is thus possible to thereby maintain the capability of the system to operate in real time.

Third Embodiment

A third embodiment of the present invention differs from the first embodiment described above in processing to be performed after Step S9 of FIG. 4. To give a specific description, in the third embodiment, after the step of FIG. 4 in the first embodiment in which the synchronization state is set to "synchronization completed" (Step S9), that is, during a period in which the normal operation is being executed under the state in which the control apparatus 1, the control apparatus 2, and the control apparatus 3 are synchronized with one another, the state data that is transmitted and received is continuously checked by the state data comparison unit 5.

During the normal operation of the control apparatus 1, the state data comparison unit 5 compares the state data on the control apparatus 1 with the state data received from the control apparatus 2 and the control apparatus 3. When the state data on the control apparatus 2 matches the state data on the control apparatus 3, and only the state data on the control apparatus 1 differs from the other state data, the state synchronization management unit 6 overwrites into the RAM 32 the state data acquired from the control apparatus 2 or the control apparatus 3 to continue the operation. The condition for overwriting the state data may be a case in which any part of the state data on the control apparatus 1 differs from that of the other state data, or may be a case in which the details of difference between the state data on the control apparatus 1 and the other state data deviate from a condition defined in advance.

Further, when the state data on the control apparatus 1 differs from the other state data to a degree that exceeds a predetermined condition, it may be assumed that a failure has occurred in the control apparatus 1 so that the control apparatus 1 is restarted by being reset. The control apparatus 1 may reset the control apparatus 1 itself.

Figure 8:
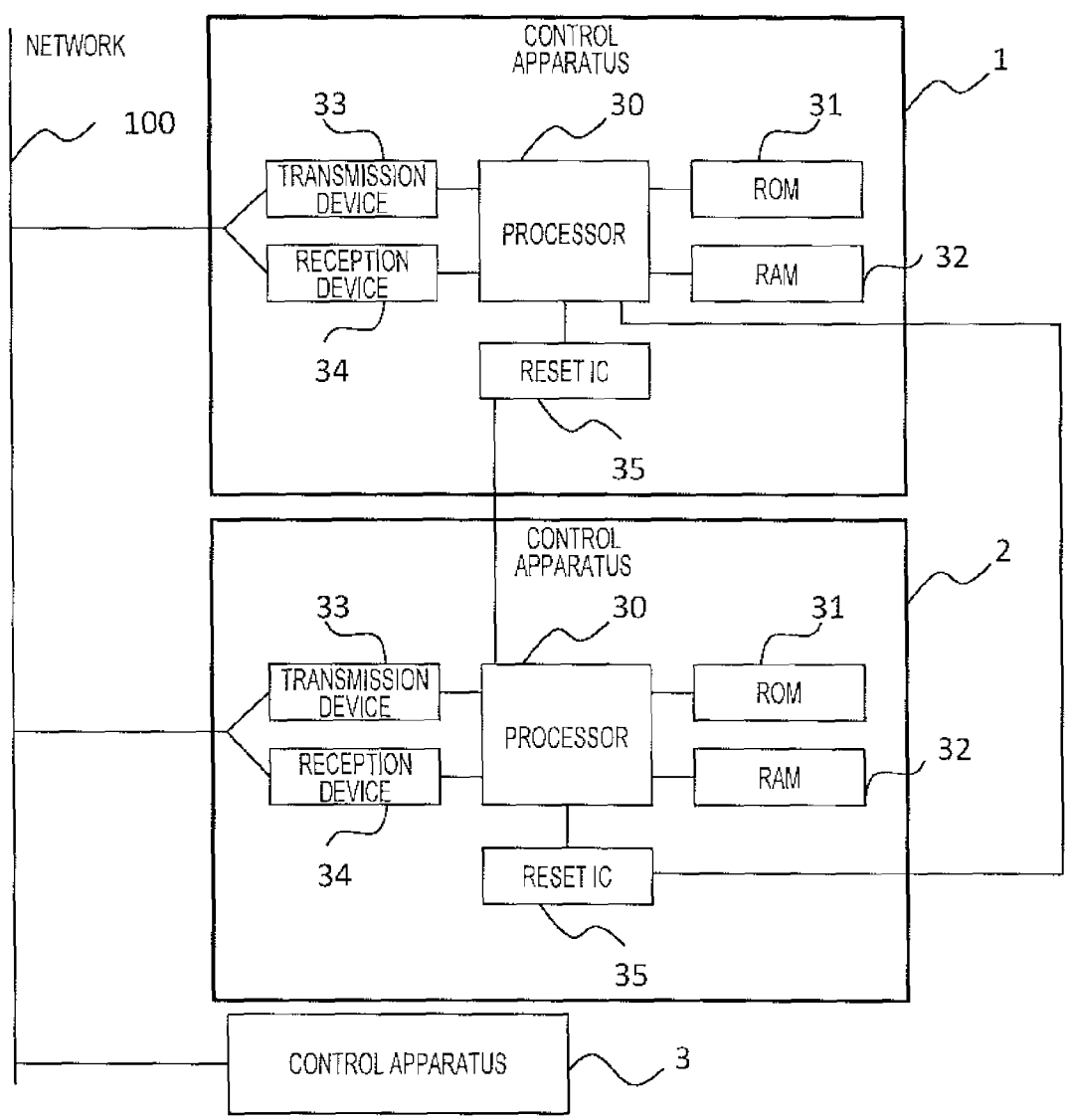
FIG. 8 is a block diagram for illustrating hardware configurations of control apparatus according to a third embodiment of the present invention.

Further, the control apparatus 1 to 3 may have configurations illustrated in FIG. 8. In FIG. 8, the processor 30 of the control apparatus 1 is connected to the reset IC 35 of the control apparatus 2. Similarly, the processor 30 of the control apparatus 2 is connected to the reset IC 35 of the control apparatus 1. The configuration of the control apparatus 3 is not shown, but similarly, the processor 30 of the control apparatus 3 is connected to the reset IC 35 of another control apparatus. With the configuration, the control apparatus other than the control apparatus 1, namely, the control apparatus 2 and 3, can control the reset IC 35 of the control apparatus 1. Accordingly, when the control apparatus 2 and the control apparatus 3 recognize that the state data on the control apparatus 1 does not match the state data on the control apparatus 2 and 3, the control apparatus 2 and 3 may reset the control apparatus 1 to restart the control apparatus 1.

Figure 9:
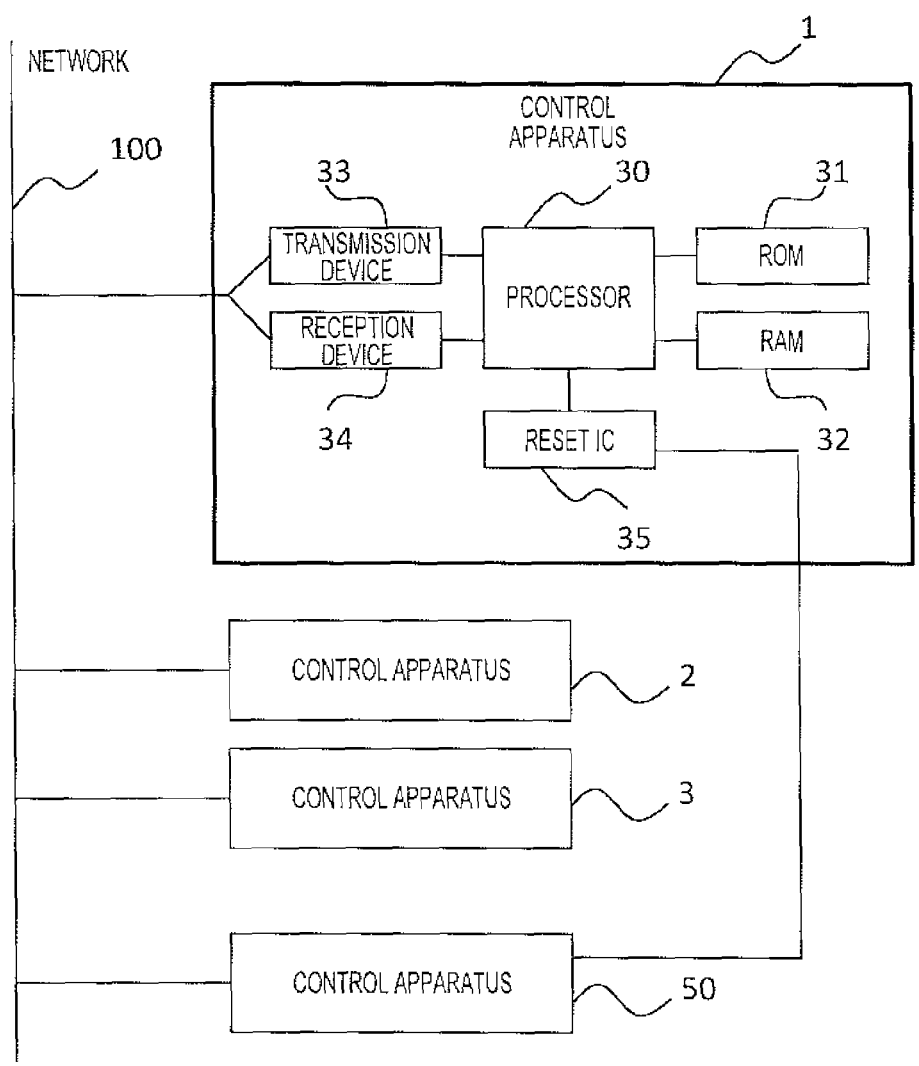
FIG. 9 is a block diagram for illustrating hardware configurations of control apparatus according to the third embodiment of the present invention.

The control apparatus 1 to 3 may also have configurations illustrated in FIG. 9. In FIG. 9, a control apparatus 50 serving as a fourth control apparatus is connected to the network 100, to which the control apparatus 1 to 3 are connected. The control apparatus 50 monitors the synchronization state and the state data of each of the control apparatus 1 to 3. In FIG. 9, when the control apparatus 50 has detected that, among the control apparatus 1 to 3, the state data on the control apparatus 1 does not match the state data on the control apparatus 2 and the control apparatus 3, the control apparatus 50 may transmit a command to reset the control apparatus 1 to the control apparatus 1 via the network 100 to instruct the control apparatus 1 to restart the control apparatus 1. As another example, in the same manner as in FIG. 8, the processor 30 of the control apparatus 50 may be connected to the reset IC 35 of the control apparatus 1 so that the processor 30 of the control apparatus 50 can control the reset IC 35 of the control apparatus 1, to thereby allow the control apparatus 50 to reset the control apparatus 1.

In the manner described above, in the third embodiment, even during the normal operation, the state data is transmitted and received through use of the data transmission/reception window 24 to allow the state data to be checked. As described above, the data transmission/reception window 24 is also effective for recovery from a minor failure that has occurred in the normal operation, and can also be used for determination of a failure through mutual determination.

Fourth Embodiment

In the configurations of the first embodiment and the second embodiment described above, depending on the synchronization state transmitted in the synchronization state transmission/reception window 23, the data transmission/reception window 24 may be set to have a variable length.

Figure 5:
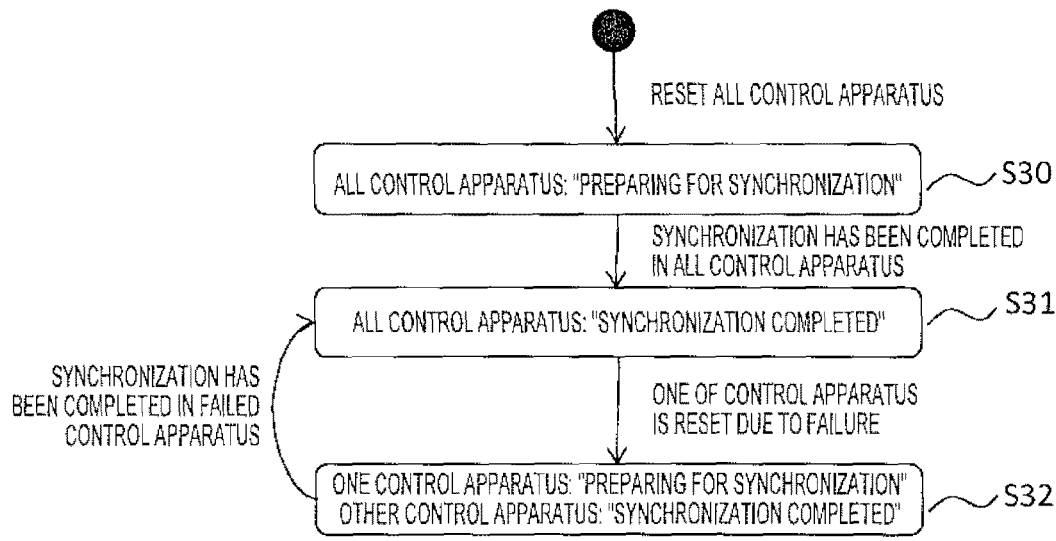
FIG. 5 is a diagram for illustrating transition of states in a fourth embodiment of the present invention.

This is described taking a state transition diagram of FIG. 5 as an example. For example, a description is given taking the configuration of the first embodiment as an example. In the case of starting the entire control system including the control apparatus 1 to 3, only checking of basic state data is performed. This reduces the amount of state data. At this time, in the synchronization state transmission/reception window 23, "preparing for synchronization" is transmitted as the synchronization state in all the control apparatus 1 to 3 (Step S30).

Meanwhile, the following case is considered: after the synchronization of all the control apparatus 1 to 3 has been completed (Step S31), only the control apparatus 1 is to be restarted while the control apparatus 2 and the control apparatus 3 are operating normally. In this case, to restart the control apparatus 1, in addition to the basic state data, the state data generated by the control apparatus 2 and the control apparatus 3, which have been operating until the occurrence of the failure, is required in order to inherit the state of the control system. Longer state data is required as this state data than that required at the time of starting the control system. At this time, in the synchronization state transmission/reception window 23, the control apparatus 2 and the control apparatus 3 transmit "synchronization completed" as the synchronization state (Step S32).

Thus, at the time of starting the entire control system, the state data to be transmitted by the control apparatus 2 and 3 can be shortened, but longer state data is required at the time of restarting the control apparatus. Further, at the time of starting the control system, the synchronization state transmitted in the synchronization state transmission/reception window 23 is "preparing for synchronization", whereas the synchronization state flowing therein is "synchronization completed" at the time of restarting the control apparatus. Therefore, in summary, the state data is short when the synchronization state is "preparing for synchronization", whereas the state data is long when the synchronization state is "synchronization completed". Therefore, through management of transition of the states depending on the synchronization state transmitted in the synchronization state transmission/reception window 23, the data transmission/reception window 24 can be set to have a variable length. That is, the data transmission/reception window 24 is shortened when the synchronization state is "preparing for synchronization", whereas the data transmission/reception window 24 is lengthened when the synchronization state is "synchronization completed".

Further, in the second embodiment, the state data to be transmitted and received by the control apparatus 1 to 3 may be a variable that is used in a program as a parameter in each of the control apparatus 1 to 3, but may also be data for cyclic redundancy check (CRC) for a variable that is used in a program as a parameter in each of the control apparatus 1 to 3. After the synchronization state is set to "synchronization completed" in Step S9 of FIG. 4, that is, under the state in which the control apparatus 1, the control apparatus 2, and the control apparatus 3 have been synchronized with each other, the state data is used as the data for cyclic redundancy check during the period in which the normal operation is being executed. When there is a mismatch in the data for cyclic redundancy check in the control apparatus 1, the synchronization state is set to "preparing for synchronization", and the synchronization state transmission/reception window 23 is used to transmit "preparing for synchronization". The control apparatus 2 and the control apparatus 3 receives "preparing for synchronization" in the synchronization state transmission/reception window 23, and switches the state data stored in the RAM 32 thereof from the data for cyclic redundancy check to a variable that is used in a program as a parameter in the control apparatus and transmits the variable in the data transmission/reception window 24. When the state data is used as the data for cyclic redundancy check, the data transmission/reception window 24 is shortened, whereas when the state data is used as a variable that is used in a program as a parameter in the control apparatus, the data transmission/reception window 24 is lengthened.

Further, when the state data in the second embodiment is not used for determination of a failure, the data transmission/reception window 24 may be omitted during the period in which the normal operation is being executed under the state in which the control apparatus 1, the control apparatus 2, and the control apparatus 3 are synchronized with one another. Even when the data transmission/reception window 24 is omitted, the data transmission/reception window 24 may be restored when the control apparatus 1, the control apparatus 2, or the control apparatus 3 transmits "preparing for synchronization" in the synchronization state transmission/reception window 23.

As described above, in the fourth embodiment, the data transmission/reception window 24 is set to have a length that is variable depending on the synchronization state or the state data. Thus, during the period in which the control apparatus 1, the control apparatus 2, and the control apparatus 3 are activated at the same time, or during the period in which the normal operation is being executed under the state in which the control apparatus 1, the control apparatus 2, and the control apparatus 3 are synchronized with one another, the state synchronization window 21 is shortened, and the normal processing window 22 can be lengthened by the corresponding amount. It is therefore possible to make effective use of temporal resources of each of the control apparatus.

Fifth Embodiment

Figure 6:
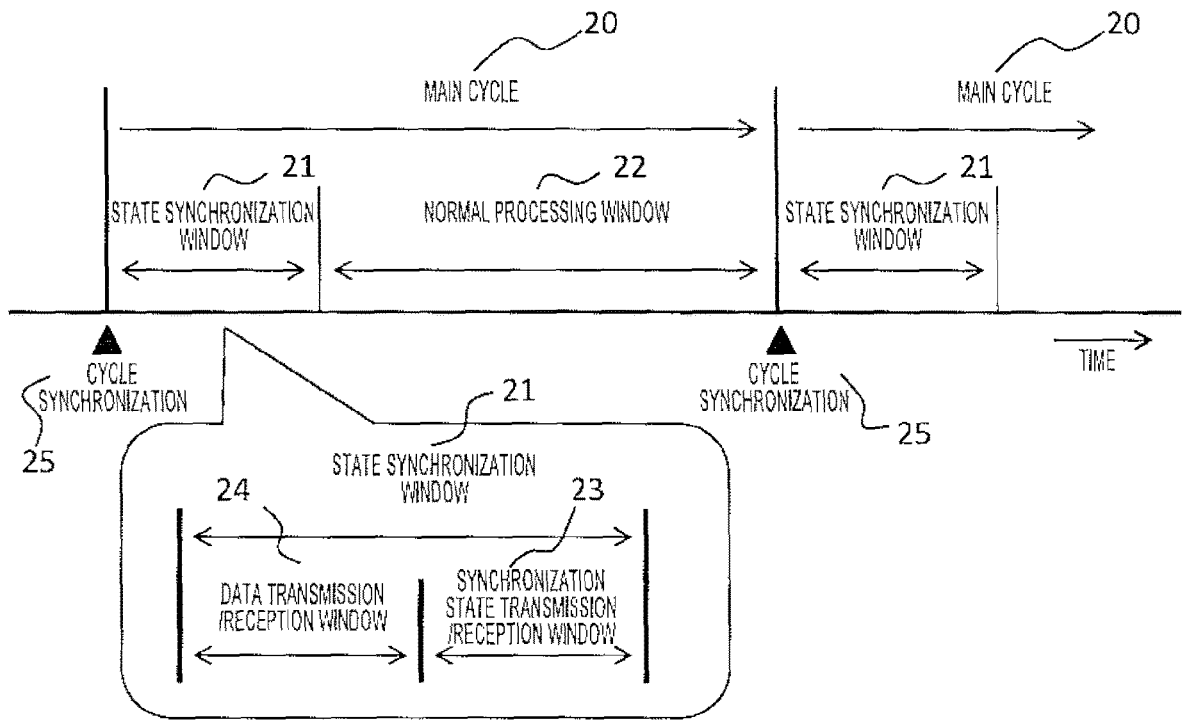
FIG. 6 is a diagram for illustrating widows of each operation cycle in a fifth embodiment of the present invention.

FIG. 6 is a diagram for illustrating windows of each operation cycle in a fifth embodiment of the present invention. FIG. 3 differs from FIG. 6 in that in FIG. 6, in the state synchronization window 21, the order of the synchronization state transmission/reception window 23 and the data transmission/reception window 24 is reverse to that of FIG. 3. That is, in FIG. 6, the data transmission/reception window 24 is provided first, and the synchronization state transmission/reception window 23 is provided next.

In the first embodiment described above, after the state synchronization management unit 6 sets the synchronization state of the control apparatus 1 to "synchronization completed" (Step S9), from the next main cycle 20, the synchronization state transmission/reception unit 7 uses the synchronization state transmission/reception window 23 to transmit the synchronization state (Step S10), and starts the normal processing (S12). However, in the fifth embodiment, the data transmission/reception window is provided first, and the synchronization state transmission/reception window 23 is provided next, which enables the normal processing (Step S12) to be executed from the current main cycle 20, and hence this configuration is effective in a system that is desired to recover earlier.

As described above, in the fifth embodiment, in the main cycle 20, the synchronization state transmission/reception window 23 is provided after the data transmission/reception window 24, which enables the normal processing to be executed from the current main cycle 20. It is therefore possible to allow the system to recover earlier.

Sixth Embodiment

In a sixth embodiment of the present invention, a description is given of a specific example of a control system to which the configuration and method described in the above-mentioned first to fifth embodiments are applied.

Figure 10:
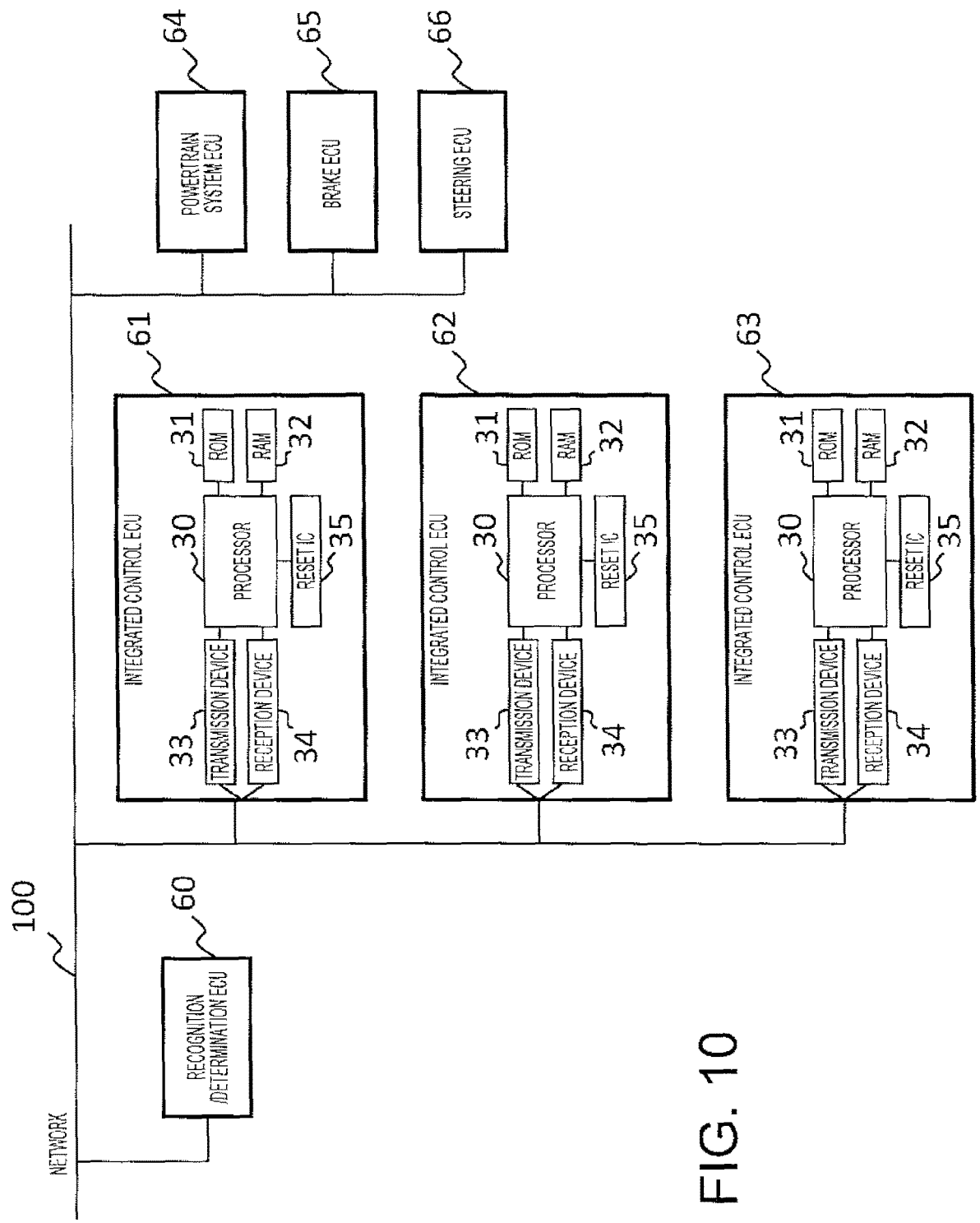
FIG. 10 is a configuration diagram for illustrating a configuration of an entire control system and hardware configurations of control apparatus in a sixth embodiment of the present invention.

FIG. 10 is a diagram for illustrating an example of the control system in the sixth embodiment. The control system illustrated in FIG. 10 is mounted in a vehicle. In the control system, a plurality of integrated control ECUs 61 to 63 are connected to one another via a network 100. The integrated control ECUs 61 to 63 correspond to the control apparatus 1 to 3 described in the above-mentioned first to fifth embodiments. The network 100 is a network provided in the vehicle.

Further, as illustrated in FIG. 10, a recognition/determination ECU 60, a powertrain system ECU 64, a brake ECU 65, and a steering ECU 66 are also connected to the network 100.

The powertrain system ECU 64 controls an engine and motor for generating a driving force of the vehicle.

The brake ECU 65 controls a brake actuator.

The steering ECU 66 controls power steering.

The recognition/determination ECU 60 recognizes, for automatic driving, a surrounding state of the vehicle to determine a travel route.

The integrated control ECU 61, the integrated control ECU 62, and the integrated control ECU 63 integrally control the powertrain system ECU 64, the brake ECU 65, and the steering ECU in order to achieve the travel route determined by the recognition/determination ECU 60.

In the control system illustrated in FIG. 10, in order to implement a fail operation for an integrated control function, the integrated control ECU 61, the integrated control ECU 62, and the integrated control ECU 63 are provided for the purpose of forming a multiplex system for the integrated control function. Each of the integrated control ECUs 61 to 63 includes the processor 30, the ROM 31, the RAM 32, the transmission device 33, the reception device 34, and the reset IC 35, which are described in the first embodiment. Further, the ROM 31 stores programs for the state data transmission/reception unit 4, the state data comparison unit 5, the state synchronization management unit 6, the synchronization state transmission/reception unit 7, and the cycle synchronization control unit 9. Further, as illustrated in FIG. 8, the processor 30 of each of the integrated control ECUs of FIG. 10 and the reset IC 35 of another integrated control ECU may be connected to each other.

The operation of the integrated control ECUs 61 to 63 of FIG. 10 is the same as the operation of the control apparatus 1 to 3 described in the above-mentioned first to fifth embodiments.

With this configuration, even when a failure occurs in one of the integrated control ECUs, for example, the integrated control ECU 61, while the other integrated control ECUs, that is, the integrated control ECU 62 and the integrated control ECU 63 continue the operation, the integrated control ECU 61 acquires the state data held by the integrated control ECU 62 and the integrated control ECU 63 during the operation so that the integrated control ECU 61 can be restarted in synchronization with the integrated control ECU 62 and the integrated control ECU 63.

In FIG. 10, the multiplex system for the integrated control ECU 61, the integrated control ECU 62, and the integrated control ECU 63 is illustrated, but the configuration of a multiplex system is not limited thereto, and other ECUs may be used to form a multiplex system. In the case of FIG. 10, the recognition/determination ECU 60, the powertrain system ECU 64, the brake ECU 65, and the steering ECU 66 may be used to form a multiplex system.

Figure 11:
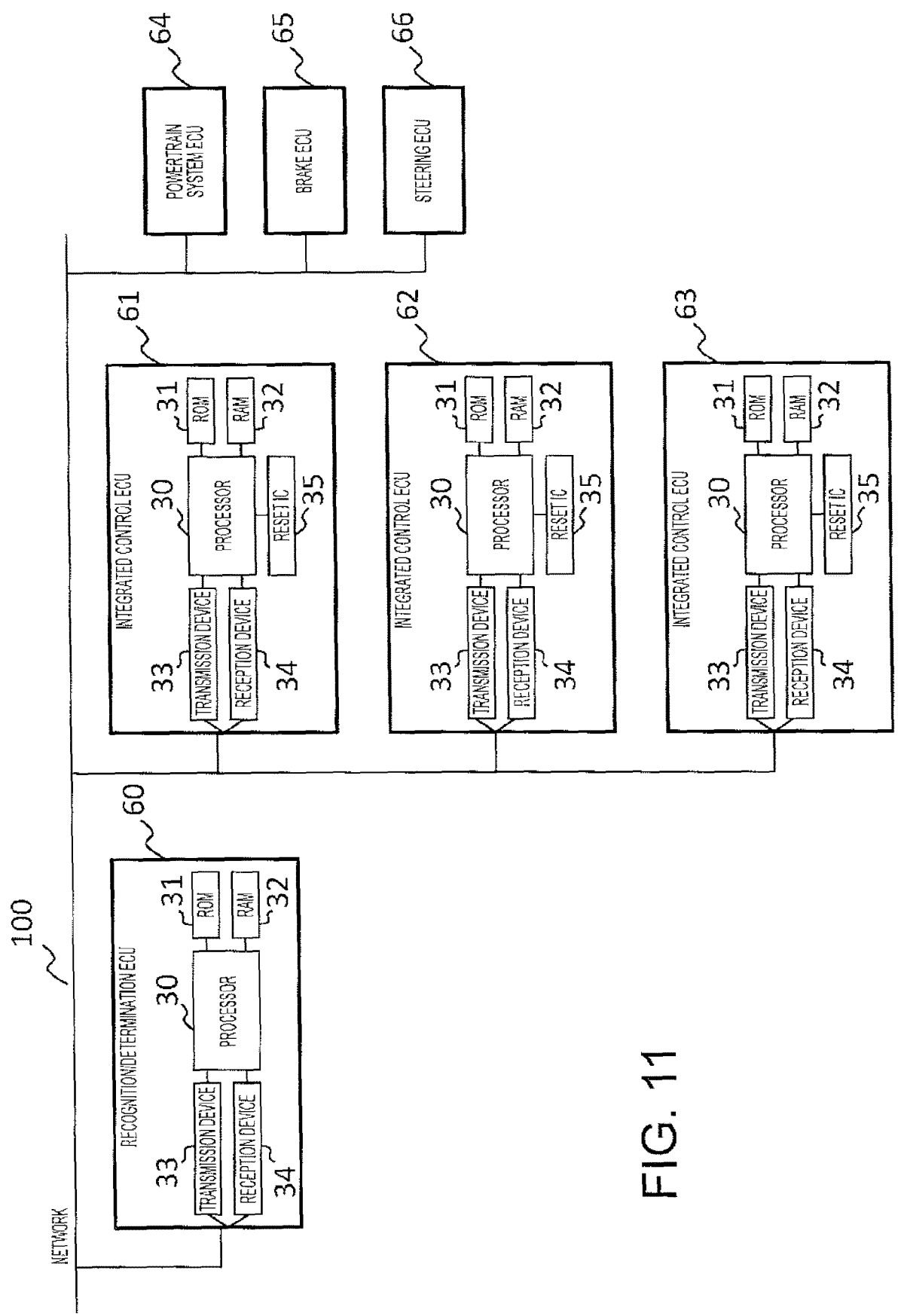
FIG. 11 is a configuration diagram for illustrating a configuration of an entire control system and hardware configurations of control apparatus in the sixth embodiment of the present invention.

FIG. 11 is an illustration of another example of the control system in the sixth embodiment.

FIG. 11 is an illustration of a configuration example in which the recognition/determination ECU 60 is added to the configuration of FIG. 10 as the fourth control apparatus described in the third embodiment.

The recognition/determination ECU 60 includes the processor 30, the ROM 31, the RAM 32, the transmission device 33, and the reception device 34. The ROM 31 stores programs for the state data transmission/reception unit 4, the state data comparison unit 5, the state synchronization management unit 6, the synchronization state transmission/reception unit 7, and the cycle synchronization control unit 9. Further, as illustrated in FIG. 9, the processor 30 of the recognition/determination ECU 60 of FIG. 11 and the reset IC 35 of one of the integrated control ECUs may be connected to each other.

The operation of the integrated control ECUs 60 to 63 of FIG. 11 is the same as the operation of the control apparatus 1 to 3 described in the above-mentioned first to fifth embodiments.

In FIG. 11, when the recognition/determination ECU 60 has detected that, among the integrated control ECU 61, the integrated control ECU 62, and the integrated control ECU 63, for example, the state data on the integrated control ECU 61 does not match the state data on the integrated control ECU 62 and the integrated control ECU 63, the recognition/determination ECU 60 can transmit a command to reset the integrated control ECU 61 to the integrated control ECU 61 via the network 100 to restart the integrated control ECU 61, or the recognition/determination ECU 60 can cause the reset IC 35 of the integrated control ECU 61 to reset the integrated control ECU 61. In FIG. 11, the configuration example in which the recognition/determination ECU 60 is added as the fourth control apparatus is illustrated, but the fourth control apparatus is not limited to the recognition/determination ECU 60, and may be another ECU. In the case of FIG. 11, the fourth control apparatus may be the powertrain system ECU 64, the brake ECU 65, or the steering ECU 66.

Figure 12:
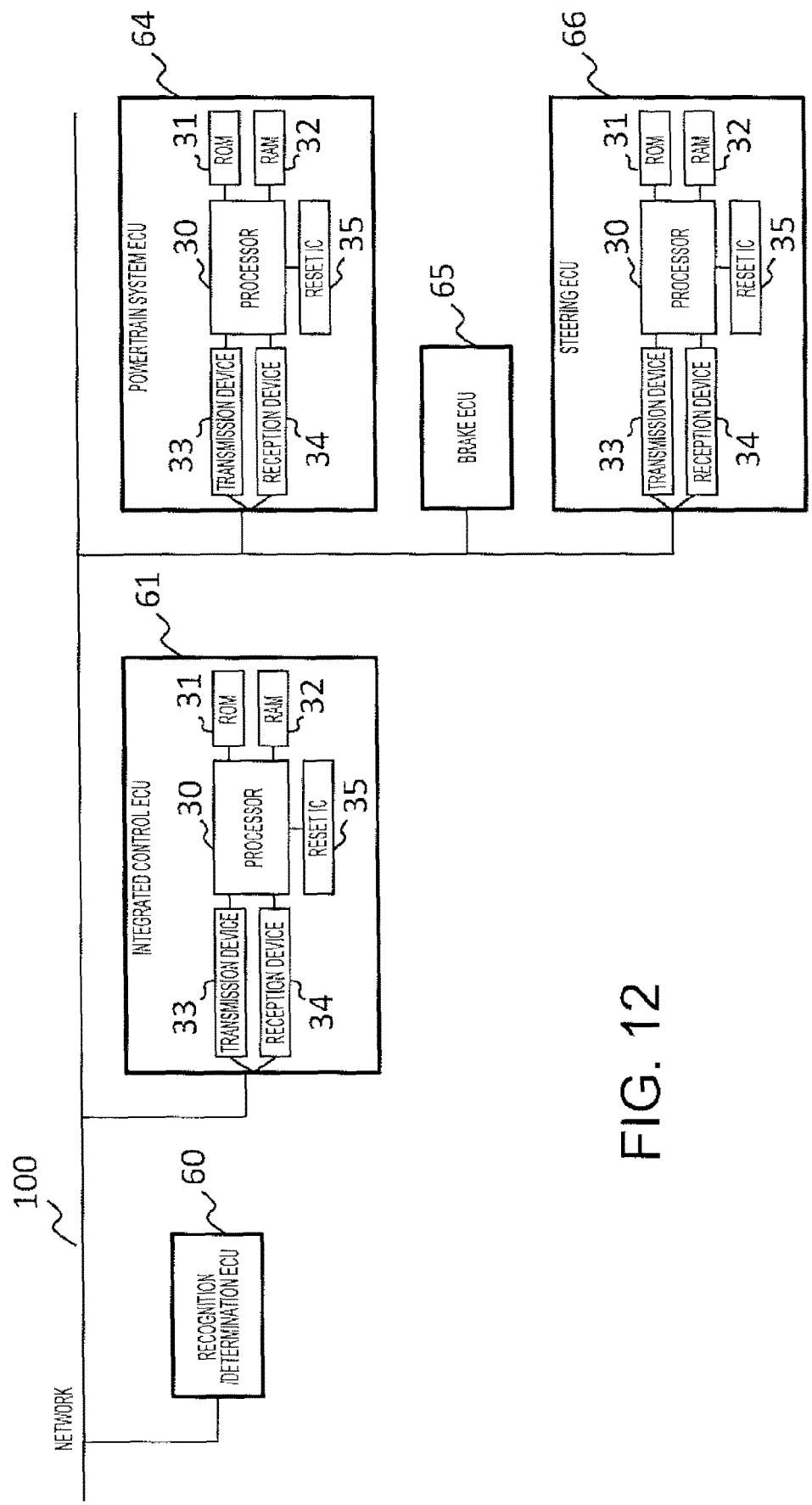
FIG. 12 is a configuration diagram for illustrating a configuration of an entire control system and hardware configurations of control apparatus in the sixth embodiment of the present invention.

A fail-safe operation and a fail operation required of the control system differ depending on the type of control system, and hence, as required, the control system may have a configuration example of FIG. 12. In FIG. 12, the integrated control ECU 61, the powertrain system ECU 64, and the steering ECU 66 each include the processor 30, the ROM 31, the RAM 32, the transmission device 33, and the reception device 34, and the ROM 31 stores programs for the state data transmission/reception unit 4, the state data comparison unit 5, the state synchronization management unit 6, the synchronization state transmission/reception unit 7, and the cycle synchronization control unit 9.

The operation of the integrated control ECUs 61, 64, and 66 of FIG. 12 is the same as the operation of the control apparatus 1 to 3 described in the above-mentioned first to fifth embodiments.

With this configuration, in the sixth embodiment, it is possible to implement synchronization of the state data involving not only the use of the state data contained in individual ECUs but also sharing of the state data among ECUs, or determination of a failure through mutual determination among ECUs.

In FIG. 12, the configuration of the combination of the integrated control ECU 61, the powertrain system ECU 64, and the steering ECU 66 is illustrated, but the configuration of the combination of ECUs is not limited thereto, and the configuration in which other ECUs are used may be adopted. In the case of FIG. 12, the configuration in which the recognition/determination ECU 60 and the brake ECU 65 are combined may be adopted.

As described above, also in the sixth embodiment, the same effects as those of the above-mentioned first to fifth embodiments can be obtained.

The invention claimed is:

1. A control apparatus mounted in a vehicle and used in a multiplex system, the control apparatus to operate in synchronization with another control apparatus via a network, the control apparatus comprising a processor:
to store in a memory state data indicating a control state of the control apparatus:
to transmit the state data stored in the memory to the another control apparatus via the network, and to receive state data on the another control apparatus from the another control apparatus via the network;
to transmit information on a synchronization state, which indicates whether a state of synchronization of the control apparatus with the another control apparatus is one of a synchronization preparation state in which the control apparatus is not synchronized with the another control apparatus and a synchronization completion state in which the control apparatus is synchronized with the another control apparatus, to the another control apparatus via the network, and to receive information on a synchronization state of the another control apparatus from the another control apparatus via the network;
to monitor whether or not the control apparatus is operating normally and restart the control apparatus when an abnormality occurs; and
to, when the control apparatus is to be restarted,
temporarily set the information on the synchronization state of the control apparatus to the synchronization preparation state;
determine whether the information on the synchronization state of the another control apparatus, which has been received from the another control apparatus, is set to the synchronization completion state;
overwrite, when it is determined that the information is set to the synchronization completion state, the state data on the another control apparatus, which has been received from the another control apparatus, into the memory as the state data on the control apparatus; and
update the information on the synchronization state of the control apparatus from the synchronization preparation state to the synchronization completion state,
when it is determined, in the determination, that the information is set to the synchronization preparation state, and when the state data on the another control apparatus, which has been received from the another control apparatus, matches the state data stored in the memory, updates the information on the synchronization state of the control apparatus from the synchronization preparation state to the synchronization completion state without overwriting the state data, and
when it is determined, in the determination, that the information is set to the synchronization preparation state, and when the state data on the another control apparatus does not match the state data stored in the memory, repeats the determination while keeping the information on the synchronization state of the control apparatus setting to the synchronization preparation state.

2. The control apparatus according to claim 1,
wherein the control apparatus is configured to perform a normal operation at a fixed cycle, which is set in advance, and
wherein the fixed cycle includes:
a synchronization state transmission/reception period for the processor to transmit and receive the information on the synchronization state; and
a data transmission/reception period for the processor to transmit and receive the state data.

3. The control apparatus according to claim 2, wherein the data transmission/reception period is set to have a length that is variable depending on the state data on the control apparatus and the state data on the another control apparatus, or on the information on the synchronization state of the control apparatus and the information on the synchronization state of the another control apparatus.

4. The control apparatus according to claim 2, wherein, in the fixed cycle, the synchronization state transmission/reception period is provided after the data transmission/reception period.

5. The control apparatus according to claim 1, wherein, the control performed by the control apparatus is different from that performed by the another control apparatus.

6. A control system comprising: a control apparatus mounted in a vehicle and used in a multiplex system, the control apparatus to operate in synchronization with another control apparatus via a network; and an operation monitoring circuit to monitor whether or not the control apparatus is operating normally and restart the control apparatus when an abnormality occurs,
wherein the control apparatus comprises a processor:
to store in a memory state data indicating a control state of the control apparatus:
to transmit the state data stored in the memory to the another control apparatus via the network, and to receive state data on the another control apparatus from the another control apparatus via the network;
to transmit information on a synchronization state, which indicates whether a state of synchronization of the control apparatus with the another control apparatus is one of a synchronization preparation state in which the control apparatus is not synchronized with the another control apparatus and a synchronization completion state in which the control apparatus is synchronized with the another control apparatus, to the another control apparatus via the network, and to receive information on a synchronization state of the another control apparatus from the another control apparatus via the network; and
to, when the control apparatus is to be restarted:
temporarily set the information on the synchronization state of the control apparatus to the synchronization preparation state;
determine whether the information on the synchronization state of the another control apparatus, which is received from the another control apparatus, is set to the synchronization completion state;
overwrite, when it is determined that the information is set to the synchronization completion state, the state data on the another control apparatus, which has been received from the another control apparatus, into the memory as the state data on the control apparatus; and
update the information on the synchronization state of the control apparatus from the synchronization preparation state to the synchronization completion state,
when it is determined, in the determination, that the information on the synchronization state of the another control apparatus is set to the synchronization preparation state, and updates, when the state data on the another control apparatus, which has been received from the another control apparatus, matches the state data stored in the memory, the information on the synchronization state of the control apparatus from the synchronization preparation state to the synchronization completion state without overwriting the state data; and
when it is determined, in the determination, that the information on the synchronization state of the another control apparatus is set to the synchronization preparation state, and repeats the determination, when the state data on the another control apparatus does not match the state data stored in the memory, while keeping the information on the synchronization state of the control apparatus setting to the synchronization preparation state.

7. A recovery processing method for a control apparatus mounted in a vehicle and used in a multiplex system, the control apparatus to operate in synchronization with another control apparatus, the recovery processing method in a case where the control apparatus is restarted comprising:
setting information on a synchronization state, which indicates whether a state of synchronization of the control apparatus with the another control apparatus is one of a synchronization preparation state in which the control apparatus is not synchronized with the another control apparatus and a synchronization completion state in which the control apparatus is synchronized with the another control apparatus, to the synchronization preparation state;
transmitting state data indicating a control state of the control apparatus, which is stored in a storage apparatus, to the another control apparatus, and receiving state data on the another control apparatus from the another control apparatus:
transmitting the information on the synchronization state, which has been set to the synchronization preparation state, to the another control apparatus, and receiving information on a synchronization state of the another control apparatus from the another control apparatus:
determining whether the information on the synchronization state of the another control apparatus, which has been received from the another control apparatus, is set to the synchronization completion state;
overwriting, when the information on the synchronization state of the another control apparatus is determined to be set to the synchronization completion state, the state data on the another control apparatus, which has been received from the another control apparatus, into the storage apparatus as the state data on the control apparatus; and
updating the information on the synchronization state from the synchronization preparation state to the synchronization completion state,
updating the information on the synchronization state of the control apparatus from the synchronization preparation state to the synchronization completion state without overwriting the state data, when it is determined, in the determining, that the information is set to the synchronization preparation state, and when the state data on the another control apparatus, which has been received from the another control apparatus matches the state data stored in the memory, and
repeating the determining while keeping the information on the synchronization state of the control apparatus setting to the synchronization preparation state, when it is determined, in the determining, that the information is set to the synchronization preparation state, and when the state data on the another control apparatus does not match the state data stored in the memory.

* * * * *